United States Patent Office 3,439,112
Patented Apr. 15, 1969

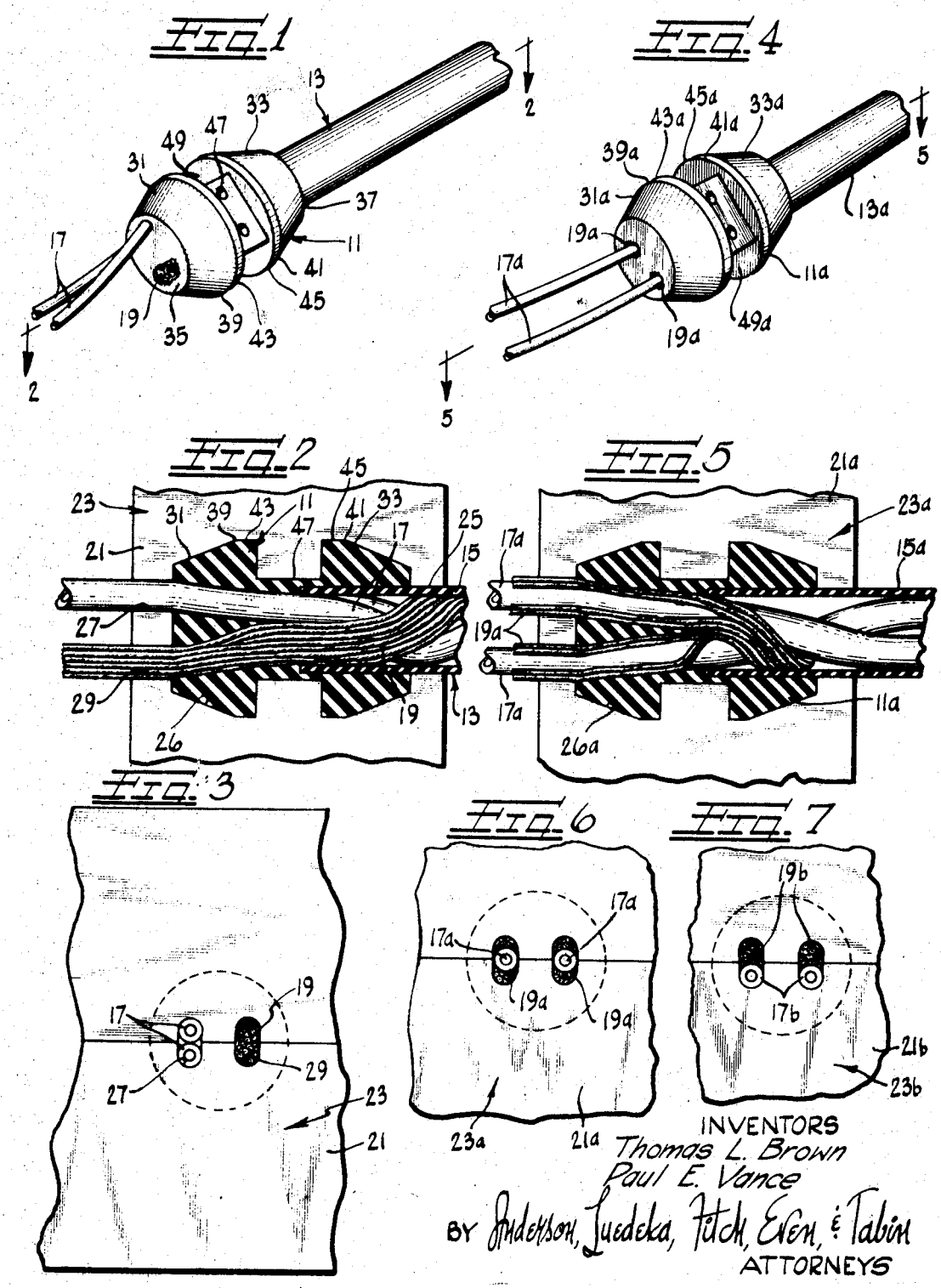

3,439,112
CABLE WITH MOLDED STRAIN RELIEF AND METHOD OF MAKING SAME
Thomas L. Brown, Richmond, Ind., and Paul E. Vance, Franklin, N.C., assignors to Belden Corporation, Chicago, Ill., a corporation of Illinois
Filed June 21, 1967, Ser. No. 647,652
Int. Cl. H01b 17/30
U.S. Cl. 174—153          7 Claims

ABSTRACT OF THE DISCLOSURE

This invention concerns an electrical cable including a molded strain relief and a method of manufacture thereof. The jacket of the cable is stripped back from one end so as to expose the conductor leads and the filler cord constructed of fibrous material. The strain relief is molded about the jacket, conductors and filler cord so that the plastic molding material penetrates the fibrous material of the filler cord thereby providing an improved high-strength bond between the strain relief and cable.

---

This invention generally relates to an electrical cable including a strain relief and a method for producing same, and more particularly relates to a cable and strain relief molded thereon so as to display high bonding characteristics, and also to an improved method of producing a cable including such a strain relief.

Normally, strain reliefs are secured to an associated electrical cable adjacent an end thereof. At the end of the cable, the jacket or sheath of the cable is removed and the insulation stripped from the conductors of the cable to facilitate connection or termination at an appliance or other device. The strain relief is secured or retained in a fixed relation with respect to the appliance chassis, and serves to isolate the terminated ends of the conductors from abrupt pulls or other forces which may be applied to the cable during use and which would otherwise cause the conductors to be broken or pulled loose from their terminals. A strain relief often serves the additional function of protecting the cable from abrasion as it passes through the appliance housing thereby eliminating the need for a grommet. To satisfactorily function as desired, a strain relief should be capable of withstanding forces sufficient to meet certain commercial standards which are accepted by the trade and further be conveniently secured to its cooperating cable and provide a neat appearance.

A particular method known to the art of providing a molded strain relief about an electrical cable includes the steps of stripping the outer jacket from the cable by an amount sufficient to expose a portion of the inner conductors. The filler material of the cable is then trimmed off even with the outer jacket and a strain relief member is molded about the jacket and the conductors generally at the point where the conductors leave the jacket. Under stress conditions such molded strain reliefs are generally unsuitable. The jacket frequently stretches under stress, which tends to peel the jacket away from the body of the strain relief. This peeling away of the jacket frequently severs the bond which was initially achieved between the cable and the strain relief.

An object of the present invention is to provide a cable including an improved molded strain relief and method of producing same. Another object is to provide an electrical cable including a molded strain relief wherein there is an improved bond between the cable and the strain relief. An additional object is to provide an electrical cable including a molded strain relief and an improved method of producing same wherein the strain relief is molded about the cable jacket, conductor leads, and filler material so as to provide an improved bond therewith.

Other objects and advantages of the present invention will become apparent through reference to the following description and accompanying drawings, in which:

FIGURE 1 is a perspective view of a cable having a strain relief molded thereon which includes certain features of this invention;

FIGURE 2 is an enlarged sectional view of the strain relief taken along the line 2—2 of FIGURE 1, the strain relief being disposed in its mold which is shown diagrammatically;

FIGURE 3 is a diagrammatic view of the front of the mold used to make the strain relief of FIGURES 1 and 2;

FIGURE 4 is a perspective view of a cable including a strain relief molded thereabout illustrating another embodiment of this invention;

FIGURE 5 is an enlarged sectional view of the strain relief taken along the line 5—5 of FIGURE 4, the strain relief being disposed in its mold which is shown diagrammatically;

FIGURE 6 is a diagrammatic view of the front of the mold used to make the strain relief shown in FIGURES 4 and 5, and FIGURE 7 is a diagrammatic view of the front of a mold used to make another embodiment of the strain relief.

Generally, in accordance with the present invention a method is provided for securing a strain relief to a cable, which cable includes at least two conductors, a fibrous filler cord, and a sheath or jacket covering the conductor and cord. A portion of the jacket is removed adjacent one end of the cable, and the strain relief is molded about the cable adjacent the end so as to adhere to the cable jacket, the conductor lead, and the filler cord. The strain relief is thus securely bonded to the cable.

More particularly, the strain relief 11 illustrated in FIGURE 1 is molded to an electric cable 13 comprising an insulating jacket or sheath 15 encircling a pair of insulated conductors 17. Intertwined with the conductors 17 within the jacket 15 is a filler cord 19 constructed of a plurality of strands of fibrous material. The strands may be formed of hemp, treated paper or other suitable material and are spirally twisted so as to form the filler cord 19.

As a preparatory step to molding the strain relief, the jacket 15 is removed so as to expose the end portions of the conductors 17 and the intertwined filler cord 19. The filler cord 19 is then unwound from the conductors 17. The cable 13 is then disposed in the lower half 21 of a split mold 23 (FIGURES 2 and 3). The cable 13 is positioned in the lower half of a cylindrical opening 25 at the rear of the mold so that the end of the sheath 15 extends about half way into a cavity 26 in the mold 23 which conforms to the desired shape of the body of the strain relief. One of the conductors 17 is positioned in the lower half of a first opening 27 in the front of the mold 23 which is elongated with rounded ends. The opening 27 is of such a size as to receive the two conductors 17 is side by side relation. The filler cord 19 is disposed in a second elongated opening 29 provided in the front of mold 23 which opening is similar to and is disposed in spaced parallel relation to the first opening 27.

The openings 27 and 29 are positioned on either side of the center line of the mold 23 and spaced at a distance such as to permit the molding compound to flow completely around both conductors 17 and the filler cord 19. As illustrated the openings 27 and 29 are spaced at a distance approximately equal to the diameter of the cable 13. The filler cord 19 is thus separated from the conductors 17 for approximately half of the length of the strain relief. Hence, when the mold 23 is closed and filled with a flowable plastic material, the plastic material contacts substantially the entire circumference of the conductors 17 and the filler cord 19 for about half the length of the strain relief. The plastic material saturates into the filler cord 19 and, when it hardens, provides a strong bond between the filler cord 19 and the strain relief 11. The plastic material also adheres to the conductors 17 and the sheath 15. The combined bonding of the conductors 17, the sheath 15 and especially the filler cord 19 to the strain relief 11 provides a strain relief which is more resistant to disengagement from its cable than strain reliefs generally known to the art.

After the molding material of the strain relief 11 has hardened, the mold 23 is opened and the strain relief 11 and its cable 13 are removed from the mold. The filler cord 19 is then cut flush with the face of the relief 11.

It should be noted that the strain relief may take various configurations without departing from the spirit and scope of this invention. The particular strain relief illustrated includes two frusto-conical portions 31 and 33, the minor diameter ends 35 and 37 of which are outermost. The major diameter ends 39 and 41 of the frusto-conical portions 31 and 33 are integrally connected to short cylindrical portions 43 and 45, respectively. The cylindrical prtions 43 and 45 are separated by a center portion 47 which is generally U-shaped in cross section and of smaller cross section than the cylindrical portions 43 and 45 so as to define a notch 49 in the strain relief. The notch 49 is particularly adapted to receive the wall of the chassis or housing (not shown) through which the cable is to pass.

Another embodiment of the strain relief is illustrated in FIGURE 4 parts similar to those shown in FIGURES 1 to 3 being indicated with the same reference numeral with the subscript *a*. In this embodiment, the filler cord 19*a* is separated into two bundles, each having approximately the same number of strands. Each bundle is then split again and the two halves of the bundle, together with one of the conductors 17*a* are brought out of one opening 27*a* or 29*a* with one half being above and one half being below the associated conductor 17*a*, as shown in FIGURE 6. Alternately, as shown in FIGURE 7, wherein similar parts are indicated with the same reference numeral with the subscript *b*, each bundle may be brought out adjacent one side of the conductor 17*b*. After molding, the fibers of the filler cord 19*a* or 19*b* are cut flush with the face of the strain relief.

Various changes and modifications may be made in the above described strain relief and method without departing from the spirit or scope of this invention. Various of the features of the invention are set forth in the following claims.

What is claimed is:
1. A method of securing a strain relief to a cable including a jacket, at least two conductors and a porous filler cord, said jacket being terminated at a distance from one end of said cable so that the filler cord and conductor leads are exposed, said method comprising molding a strain relief of plastic material about said cable at a position whereat said strain relief encases said jacket, said conductors and said filler material with said filler material extending beyond said strain relief, thereby providing a stress resistant strain relief which is securely bonded to said cable.

2. The method of claim 1 which further includes, before molding, the steps of separating said filler cord from said conductors, disposing the conductors in one opening in a mold for said strain relief, and disposing the filler cord in a second opening in the mold, and which further includes, after molding, the step of cutting the filler cord adjacent said strain relief.

3. The method of claim 1 wherein said cable includes two conductors and wherein said filler cord is formed of a plurality of fibrous strands, the method which prior to the molding step further includes the steps of dividing said filler cord into two bundles, one associated with each conductor, disposing one of said filler bundles together with its associated conductor in an opening in a mold for the strain relief, and disposing the other of said bundles with its associated conductor in a second opening in said mold and, after molding, the further step of cutting the filler strands adjacent the strain relief.

4. An article of manufacture comprising a cable having an outer jacket, a filler cord of porous material and at least two conductors, said jactet being terminated at a position short of the ends of said filler cord and said conductors, and a strain relief of plastic material molded about said cable over the terminal end of said jacket and encasing a segment of said filler cord and said conductors, the conductors and filler cord extending beyond said strain relief, whereby the plastic material of said strain relief penetrates the porous material of the filler cord of said cable so as to produce a secure bond therewith.

5. An article in accordance with claim 4 wherein said conductors and said filler cord extend through a portion and outwardly of said strain relief in separate paths.

6. An article in accordance with claim 4 wherein said cable includes two conductors, each of which extends along a different path through a portion and outwardly of said strain relief and wherein said filler cord is separated into two bundles within said strain relief, each of said filler bundles extending outwardly of said strain relief adjacent one of said conductors.

7. An article in accordance with claim 5 wherein the filler cord is formed of a plurality of fibrous strands, wherein the conductors and the filler cord exit from the strain relief at a spacing approximately equal to the diameter of the jacket, and wherein the jacket extends approximately half way into the strain relief.

References Cited
UNITED STATES PATENTS

| | | | |
|---|---|---|---|
| 1,964,350 | 6/1934 | Greene | 339—104 |
| 2,115,495 | 4/1938 | Mapelsden | 174—70 |
| 2,421,456 | 6/1947 | Judisch. | |
| 2,862,996 | 12/1958 | Holmes | 174—135 |

LARAMIE E. ASKIN, *Primary Examiner.*

U.S. Cl. X.R.

339—102, 104; 29—592